UNITED STATES PATENT OFFICE.

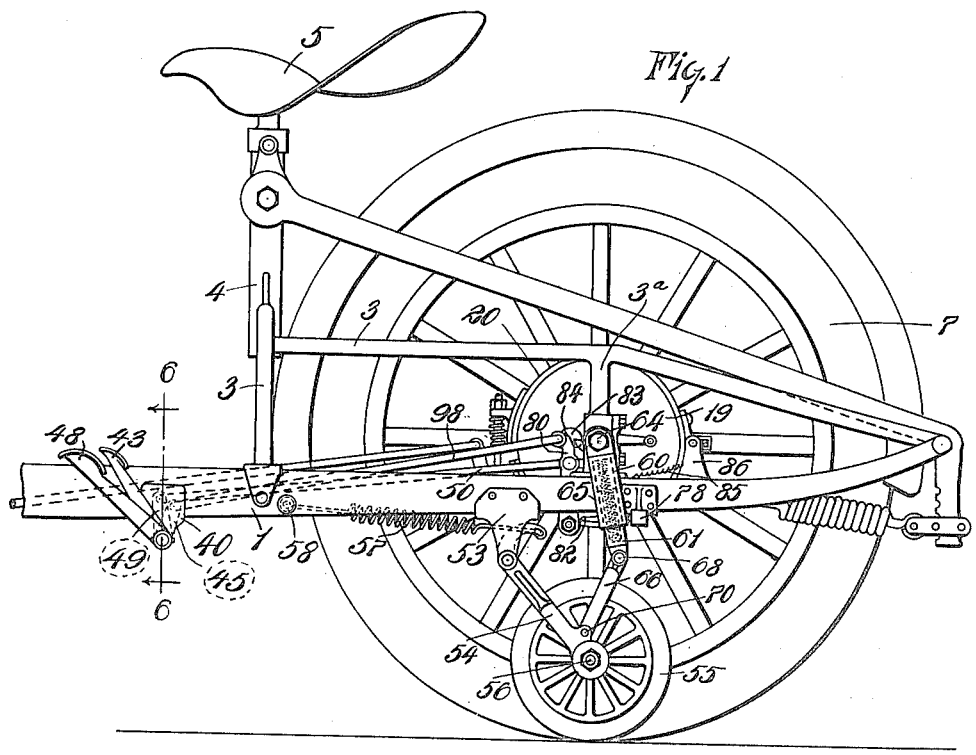

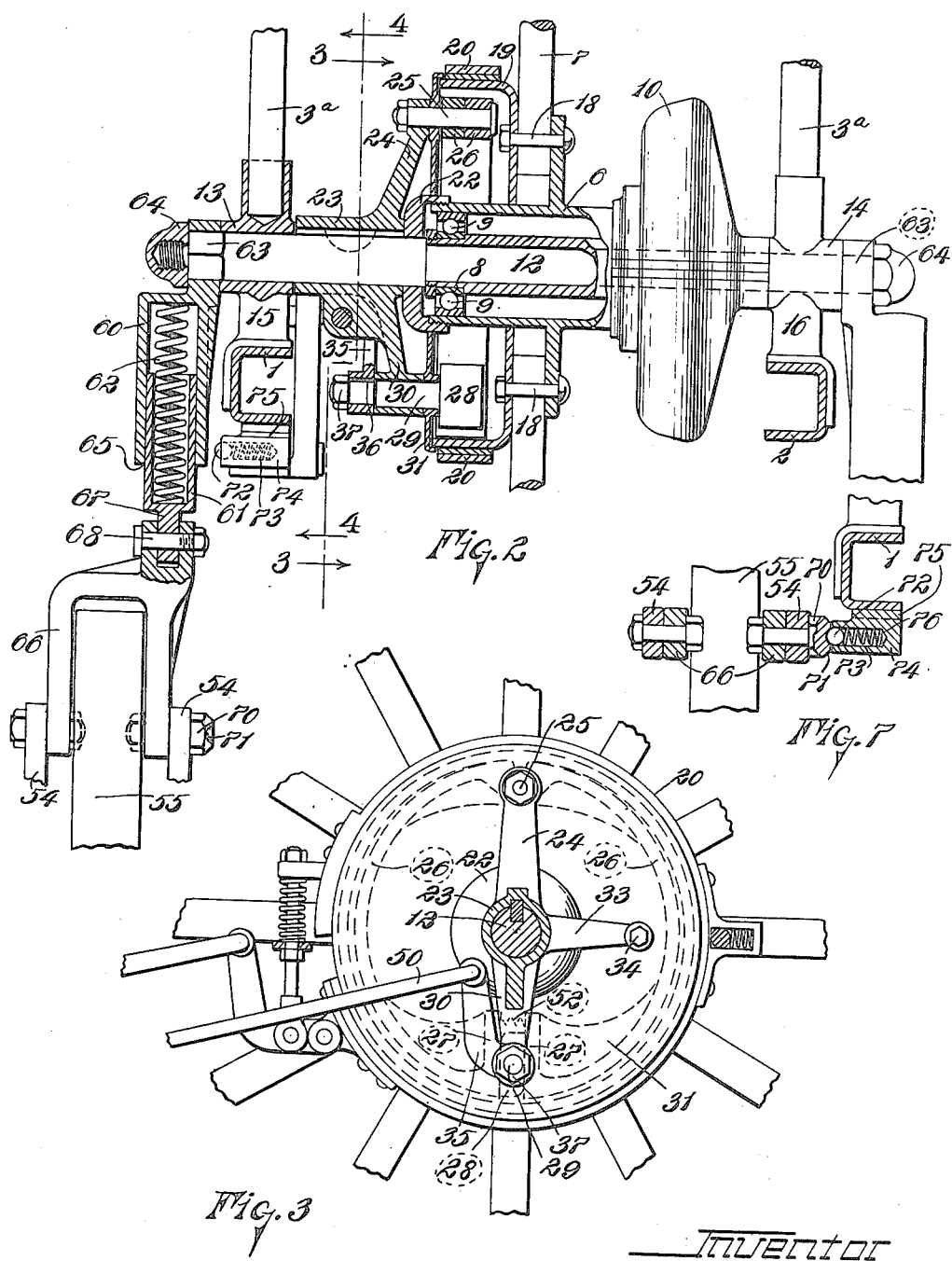

JOHN L. LAKE, OF CLEVELAND, OHIO, ASSIGNOR TO ANDREW S. GRANT, OF TORONTO, CANADA.

STABILIZING MECHANISM FOR MOTOR-CYCLES AND THE LIKE.

1,227,635.  Specification of Letters Patent.  Patented May 29, 1917.

Application filed August 14, 1915.  Serial No. 45,447.

*To all whom it may concern:*

Be it known that I, JOHN L. LAKE, a subject of the King of Great Britain, and a citizen of the Dominion of Canada, residing at Cleveland, in the county of Cuyahoga and State of Ohio, have invented a certain new and useful Improvement in Stabilizing Mechanisms for Motor-Cycles and the like, of which the following is a full, clear, and exact description, reference being had to the accompanying drawings.

This invention relates to stabilizing or bracing mechanism that is especially adapted for embodiment in motor-cycles, although suitable modifications of the same may be advantageously incorporated in the ordinary bicycle and vehicles of like character.

The purpose of the stabilizing mechanism is to hold the vehicle in an upright position when at rest, or when starting or stopping.

Mechanisms for this purpose are in use at the present time, but in cases where the mechanism is effective while the vehicle is in motion, there is no compensation made for the variations in distance between the vehicle frame and road—such variations being due either to irregularities in the road, or variations in the inflation of the vehicle tires—and consequently considerable difficulty has been caused by the mechanism tending to or actually removing the driving wheel of the vehicle out of contact with the road. Furthermore, the non-yielding character of such stabilizing mechanisms, has made the turning of the vehicle difficult.

It is the primary object of my invention, therefore, to provide stabilizing mechanism that is yieldingly held in operative relation to the road, thereby to obviate the above difficulties.

A further object of the invention is to provide stabilizing mechanism that may be automatically lowered into operative relation to the road by the momentum of the vehicle; which may be folded up into ineffective position by a very slight exertion on the part of the operator, and to place the actuating means for accomplishing these ends in easy reach of the rider.

The invention further provides means for retaining the stabilizing mechanism in ineffective or folded condition against accidental displacement and against rattling.

To the attainment of the above ends, and the accomplishment of further objects which will become apparent as this description proceeds, the invention consists of the combination of elements set forth in the annexed claims and illustrated in the accompanying drawings; and while I will proceed to describe in detail the construction illustrated in the drawings, I wish to be understood as not limiting myself to such structural details further than is required by the terms of the claims, and is rendered necessary by the state of the prior art.

In the drawings, Figure 1 represents, in side elevation, the rear portion of a motor-cycle equipped with my invention; Fig. 2 is a vertical sectional detail through the center of the rear or driving wheel of the vehicle; Fig. 3 is a section on the section line appearing in Fig. 2 and looking in the direction of the arrows 3; Fig. 4 is a section on the same line and looking in the reverse direction, as indicated by the arrows 4; Fig. 5 is a sectional detail on line 5—5 of Fig. 4; Fig. 6 is a similar view on line 6—6 of Fig. 1; and Fig. 7 is a detail of the means for retaining the stabilizing mechanism in ineffective or folding condition against accidental displacement and for preventing it from rattling.

The main frame of the vehicle shown herein comprises a pair of side members 1 and 2 which, as will be seen from Figs. 2, 6 and 7, constitute inwardly opening channel members. Tubular brackets 3 rise from the rear end of each side member of the frame, and their forward ends support a post 4 to which the seat 5 is yieldingly connected. These elements of the vehicle constitute no part of my present invention and will therefore be described no further in detail. The tubular hub 6 of the driving wheel 7 is rotatably mounted upon a sleeve 8 (Fig. 2) between which sleeve and the tubular hub there are interposed ball bearings 9. The hub 6 is provided with suitable driving gearing that is housed within the casing 10. A shaft 12 extends through the sleeve 8 and is journaled, at its opposite ends, in bosses 13 and 14 of standards 15 and 16, respectively, which rise from the respective side members 1 and 2 of the vehicle frame. To the upper end of each standard is connected the vertical member 3ª of one of the aforesaid brackets 3.

Secured to one side of the wheel 7, by bolts 18, is a brake-drum 19, with the outer periphery of which coöperates the brake-band 20. This brake may be actuated by the usual mechanism employed in such connections. The end of the hub 6, remote from the casing 10, is closed by a cap 22 that is threaded onto the end of the hub, and keyed to the shaft 12 between the standard 15 and said cap 22 is the hub 23 of a spider 24. One leg of the spider (that to which the numeral 24 is applied) rises from the inner end of the hub 23 and carries a bolt 25 whereon are journaled the overlapping ends of a pair of friction shoes 26. The adjacent lower ends of the friction shoes are provided with opposed abutments 27 between which is adapted to oscillate a flat head 28 carried by a stub shaft 29 that is journaled in the depending leg 30 of the aforesaid spider. A plate 31 closes the side of the brake-drum adjacent the spider 24, and the same is provided with apertures for the accommodation of the bolt 25 and the stub shaft 29, and has a central opening for the cap 22. A third leg 33 of the spider extends toward the rear and is connected with the plate 31 by a screw 34.

An arm 35 is secured, as by means of a key 36, to the outer end of the stub shaft 29. A nut 37 is threaded on to the protruding end of the shaft to retain the arm in place. In Figs. 1 and 6, a bracket 40 is shown as secured to the underneath side of the frame member 1 just forward of the vertical line of the seat 5. Within a transverse cylindrical boss 41 of this bracket is journaled a sleeve 42 that is provided at its outer end with a pedal 43, and that has secured to its inner end, as by means of the key 44, an arm 45. A shaft 46 is journaled in the sleeve 42, and the hub 47 of a pedal 48 is pinned to the outer end of this shaft, while an arm 49 is pinned to its inner end. A rod 50 connects the arms 49 and 35. Therefore, upon a depression of the pedal 48, the arm 35 will be rocked to oscillate the stub shaft 29, with the head 28, and by reason of the shape of said head, its oscillation will cause a separation of the abutments 27 of the friction shoes 26, whereby said shoes will be projected forcibly against the inner periphery of the brake-drum 19. A spring 52 tends to draw the free end of the friction shoes 26 toward each other. It will be understood that when the foregoing operation is performed the spider 24 becomes locked to the wheel 7 through the brake-drum 19, so that the rotation of the wheel tends to rotate the spider and consequently the shaft 12, and all elements secured thereto.

Pivoted to the lower ends of brackets 53, depending from the side members 1 and 2, are hangers 54, the lower ends of which are forked to receive between the branches thereof the auxiliary wheels 55 of the stabilizing mechanism. The wheels are journaled upon suitable shafts 56, carried by the lower ends of the hangers 54. The upper ends of the hangers are curved upwardly and toward the rear from their respective pivot points, and to the upper end of each hanger is connected one end of a spring 57, the opposite end of which is anchored at 58 to the corresponding side member of the vehicle frame. These springs tend to elevate the auxiliary wheels as will be readily understood from the drawing. Toggle connections are interposed between the ends of the shaft 12, and the free ends of the hangers 54. The upper link of each of the toggles is formed of two telescoping tubular members 60 and 61, which contain a spring 62 that tends to separate such members. The upper end of each of the tubular members 60 is held upon one of the squared ends 63 of the shaft 12 by means of a nut 64. By virtue of this style of connection, the members 60 are caused to rotate with the shaft 12. For convenience the members 60 and 61 will be referred to as the upper toggle link 65. The lower link 66 of the toggle consists of a fork, the lower ends of the branches whereof are pivotally connected to the corresponding branches of the forked hangers 54.

The upper end of each of the lower links 66 is bifurcated to receive a lug 67 that depends from the lower end of the upper link, and said links are connected by the knuckle bolt 68.

A bolt 70 connects the inner fork of the lower toggle link 66, that is located on the near side of the vehicle as viewed in Fig. 1, to the corresponding branch of the forked hanger 54, the head of the bolt 70 being recessed at 71 for coöperation with a plunger 72 that occupies a bore 73 in a boss 74, constituting a part of a member 75 that is secured to the underneath side of the frame member 1. The plunger consists of a ball that is retained within the bore by having the metal of the boss peened over about the end of the bore, and a compression spring is interposed between the end wall of the bore and the opposed surface of the ball. The coöperation of the plunger 72 with the head of the bolt 70 assists in holding the hangers 54 in elevated position against accidental displacement, and prevents the parts from rattling when the vehicle is in motion.

A bumper or stop 78 is secured to the frame member 1 in a position to be engaged by the upper link 65 of the toggle connection when the stabilizing mechanism is in effective position. The toggle link is positively held against the stop or bumper 78 by mechanism which will now be described. A latch bar 80 (see Fig. 4) is pivoted on a stud 81, carried by a member 82 that is secured to the underneath side of the frame member 1 slightly forward of the axis of the shaft 12. The nose 83 of the latch coöperates with a tooth 84 that projects from the side of the hub 23 of the spider 24. The latch is retained in normal position for coöperation with the aforesaid tooth, by means of a spring 85, one end of which is attached to the latch and the other to a bracket 86 which rises from the frame member 1. (The bracket 86 forms a support for one side of the brake band 20.) With the latch in effective position, it will be seen that the spider, and consequently the shaft 12 and toggles 60 are firmly held against movement in a direction away from the stop or bumper 78. This same mechanism, augmented by parts which will now be described, is used for imparting an initial rotation to the spider and shaft, thereby to dislodge the toggle connections from their position against the stop or bumper 78, immediately after the nose of the latch has been removed from the tooth 84. For the attainment of its second function, the latch bar 80 is provided with a plunger 88, reciprocable within a tubular housing 89 that extends through the latch bar 80 (see Fig. 5). Except for the convenience of manufacture, the tubular housing could as well be made an integral part of the latch bar. The plunger 88 is impelled forward by a spring 90 that is confined between the end of the housing and the opposed end of the plunger, and the plunger is held against removal and from turning by means of a screw 91 that is threaded through the side of the bar and housing and has a projection which enters a groove 92 formed in the side of the plunger. The rear side of the protruding end of the plunger is beveled for coöperation with the beveled end 93 of an elongated head 94 that constitutes a part of a bolt 95 extending through a lug 96 that depends from the hub 23 of the spider 24, the bolt being locked to such lug by means of the nuts 97 (see Fig. 4). The rear side of the head 94 is made straight for coöperation with the straight front side of the plunger 88.

From the foregoing it will be seen that when the latch bar is swung forward to unlock the spider, the plunger 88 will engage the head 94 of the bolt 95 and rock the shaft 12 enough to swing the links of the toggle connections forward to and beyond alinement or, in other words, through "dead center" position thereby to break the knee of the toggle connection. Immediately, the spring 57 will elevate the hangers 54 with the wheels 55, and through the toggle connections, rotate the shaft 12 to the limit of its movement in the corresponding direction. The latch bar is actuated by the arm 45 that is adapted to be oscillated by the pedal 43, already described, through the intervention of a rod 98.

It will be assumed that the above operation has been performed by the driver after he has started the machine. When he desires to stop, or to slow down to a very low speed, and under such circumstances be relieved of the task of maintaining the equilibrium of the vehicle, he may depress the pedal 48 which will separate the friction shoes and operatively connect the spider 24 to the brake drum 19. The rotation of the wheel 7 will now be imparted to the shaft 12, thereby to rotate such shaft and straighten out the toggle connections and depress the hangers 54 and wheels 55. In resuming the position it occupies when the stabilizing mechanism is in effective condition, the plunger 88 rides over the head 94 of the bolt 95.

It will be explained that in stopping the vehicle, the actuation of the stabilizing mechanism will act to brake the machine and retard its travel; and reversely, that the momentum of the machine provides the power for actuating the stabilizing mechanism, thereby relieving the rider of such work. It will be seen, therefore, that the operation of the stabilizing mechanism to render it either effective or ineffective requires but little effort on the part of the rider, the stout spring 57 acting to recover the stabilizing mechanism, and the momentum of the machine to counteract the effect of the springs 57 and lower the stabilizing mechanism into operative relation to the road.

Having thus described my invention, what I claim is:—

1. In stabilizing mechanism for vehicles of the class set forth, the combination of a brace member pivotally connected to one side of the vehicle frame, means tending to elevate the brace member, and further means for yieldingly retaining the brace member in effective position in opposition to the first mentioned means.

2. In stabilizing mechanism for vehicles of the class set forth, the combination of a brace member pivotally connected to one side of the vehicle frame, means for elevating the brace member, and further means for lowering the brace member and for yieldingly retaining said member in effective position.

3. In stabilizing mechanism for vehicles of the class set forth, the combination of an auxiliary wheel mounted in a hanger pivotally attached to one side of the vehicle frame, means for elevating the hanger thereby to remove the wheel from the road, and further means for moving the hanger to and for yieldingly retaining it in a position to hold the wheel in contact with the road.

4. In stabilizing mechanism for vehicles of the class set forth, the combination of an auxiliary wheel mounted in a hanger pivotally attached to one side of the vehicle frame, means for elevating the wheel, and a two-link toggle connection between the hanger and the frame for retaining the wheel in operative relation to the road, one link of the toggle comprising telescoping members, and a compression spring interposed between said members.

5. In stabilizing mechanism for vehicles of the class set forth, the combination of a brace member pivotally connected to one side of the vehicle frame, means for elevating the brace member, further means tending to retain the brace member in elevated position against accidental displacement, and mechanism for lowering the brace member and retaining it in operative relation to the road.

6. In stabilizing mechanism for vehicles of the class set forth, the combination of a brace member pivotally connected to one side of the vehicle frame, means tending to elevate the brace member, further means for lowering the brace member into effective position, and mechanism for operatively connecting the last mentioned means to one of the vehicle wheels whereby said means may be actuated to lower the brace member by the rotation of the wheel.

7. In stabilizing mechanism for vehicles of the class set forth, the combination of a brace member pivotally connected to one side of the vehicle frame, means tending to elevate the brace member, further means for lowering the brace member into effective position, mechanism for operatively connecting the last mentioned means to one of the vehicle wheels whereby said means may be actuated to lower the brace member by the rotation of the wheel, and further mechanism for rendering the second mentioned means ineffective thereby to allow the first mentioned means to elevate the brace member.

8. In stabilizing mechanism for vehicles of the class set forth, the combination of a brace member pivotally connected to one side of the vehicle frame, toggle connections between said member and the frame, a spring tending to retain the brace member elevated, operative connections between the toggle connections and one wheel of the vehicle whereby the rotation of said wheel will straighten out the toggle connections thereby to lower the brace member into operative relation to the road against the tension of the aforesaid spring, a stop for retaining the toggle connections in effective position, and further means for removing the toggle connections from the aforesaid stop whereby the spring may act to elevate the brace member.

9. In stabilizing mechanism for vehicles of the class set forth, the combination of a brace member pivotally connected to one side of the vehicle frame, means for elevating said member, a shaft supported by the frame of the vehicle, toggle connections between said shaft and the aforesaid brace member, one end of the toggle being non-rotatably connected to said shaft, and mechanism for operatively connecting said shaft to one of the wheels of the vehicle whereby the same may be rotated by the rotation of the wheel thereby to straighten out the toggle connections and depress the brace member.

10. In stabilizing mechanism for vehicles of the class set forth, the combination of a brace member pivotally connected to one side of the vehicle frame, means for elevating said member, a shaft supported by the frame of the vehicle, toggle connections between said shaft and the aforesaid brace member, one end of the toggle being non-rotatably connected to said shaft, mechanism for operatively connecting said shaft to one of the wheels of the vehicle whereby the same may be rotated by the rotation of the wheel thereby to straighten out the toggle connections and depress the brace member, a latch for locking said shaft against rotation when the brace member is depressed, and means for actuating said latch to release the shaft and to impart an initial rotation to said shaft to render the toggle connections ineffective.

11. In stabilizing mechanism for vehicles of the class set forth, the combination of a brace member pivotally connected to one side of the vehicle frame, a spring tending to elevate said member, a shaft supported by the vehicle frame, toggle connections between said shaft and the free end of the brace member, one end of the toggle connections being non-rotatably connected to the shaft, means for operatively connecting said shaft to one wheel of the vehicle whereby said shaft may be rotated by the rotation of the wheel in a direction to straighten out the toggle connections and depress the brace member into operative relation to the road, a latch for holding said shaft against rotation when the brace member is depressed, and means for releasing said latch and for imparting initial rotation to the shaft in a direction to render the toggle connections ineffective and allow the aforesaid spring to elevate the brace member.

12. In stabilizing mechanism for vehicles of the class set forth, the combination of a brace member located on each side of the vehicle in the vicinity of the rear wheel thereof, a shaft extending through the rotating axis of the aforesaid vehicle wheel, connections between each end of said shaft and one of the aforesaid brace members, and mechanism for rotating said shaft to raise and lower said brace members.

13. In stabilizing mechanism for vehicles of the class set forth, the combination of a brace member pivotally connected to each side of the vehicle frame in the vicinity of the rear wheel thereof, a spring tending to elevate each brace member, a shaft coincident with the rotating axis of the aforesaid vehicle wheel, toggle connections between each end of said shaft and one of the aforesaid brace members, means for operatively connecting the shaft to the vehicle wheel whereby the turning of said wheel will rotate the shaft to straighten out the toggle connection, thereby to lower the brace members into operative relation to the road, a latch for retaining the shaft against rotation when the brace members are depressed, means for actuating said latch to release the shaft, connections between said latch and the shaft whereby the releasing of the latch will impart an initial rotation to the shaft in a direction to render the toggle connection ineffective and allow the aforesaid spring to elevate the brake members.

14. In stabilizing mechanism for vehicles of the class set forth, the combination of a hanger pivotally connected to each side of the vehicle frame in the vicinity of the rear wheel thereof, an auxiliary wheel mounted in each hanger, a spring having connection with the vehicle frame and each of the aforesaid hangers for elevating the hanger and removing the wheel from contact with the road, a shaft coincident with the rotating axis of the rear wheel of the vehicle, toggle connections between each end of the shaft and the free end of one of the aforesaid hangers, mechanism for operatively connecting the shaft to the vehicle wheel whereby the turning of the vehicle wheel will rotate the shaft to straighten out the aforesaid toggle connections and thereby depress the hangers with the auxiliary wheels in operative relation to the road, a latch pivotally connected to the vehicle frame, a projection carried by the shaft for coöperation with said latch thereby to retain the shaft against rotation when the hangers are depressed, means for operating said latch to unlock the shaft, connections between said latch and the shaft whereby the unlocking of the latch will impart initial rotation to the shaft in a direction to render the toggle connections ineffective so that the aforesaid springs may elevate the hangers and remove the auxiliary wheels from the road.

In testimony whereof, I hereunto affix my signature in the presence of two witnesses.

JOHN L. LAKE.

Witnesses:
M. L. THOMSEN,
F. D. McMAHON.